United States Patent [19]

Cooper et al.

[11] Patent Number: 5,277,314
[45] Date of Patent: Jan. 11, 1994

[54] RETAINER RING FOR WELDING WIRE CONTAINER DISCLOSURE

[75] Inventors: William D. Cooper, Concord; Herbert H. Matthews, III, Willoughby; Lee E. Seufer, Cleveland; Steven J. Tokarz, Euclid, all of Ohio

[73] Assignee: The Lincoln Electric Company, Cleveland, Ohio

[21] Appl. No.: 23,756

[22] Filed: Jan. 19, 1993

Related U.S. Application Data

[63] Continuation of Ser. No. 716,910, Jun. 18, 1991.

[51] Int. Cl.$^5$ .................... B65H 49/08; B65H 59/06
[52] U.S. Cl. .................... 206/398; 206/408; 206/409; 242/128; 242/129; 242/171; 242/172
[58] Field of Search ............. 242/128, 129, 170, 171, 242/172, 159; 206/389, 398, 408, 409, 413, 414; 267/161, 162, 182; 411/531, 544, 546; 116/152, 155, 156, 157, 161, 165, 167, 170, 171

[56] References Cited

U.S. PATENT DOCUMENTS

| | | |
|---|---|---|
| 9,605 | 3/1881 | Palmer . |
| 943,202 | 12/1909 | Struss . |
| 969,270 | 9/1910 | Gray .................... 116/167 |
| 1,952,056 | 3/1934 | Cook .................... 242/129 |
| 2,159,393 | 5/1939 | McCrudden .................... 411/148 |
| 2,243,279 | 5/1941 | Kinney .................... 45/71 |
| 2,321,889 | 6/1943 | Bailey et al. .................... 117/79 |
| 2,431,120 | 11/1947 | Howe .................... 267/161 X |
| 2,552,594 | 5/1951 | Scott, Jr. .................... 206/52 |
| 2,565,108 | 8/1951 | Zahodiakin .................... 267/162 |
| 2,579,131 | 12/1951 | Tinsley et al. .................... 206/52 |
| 2,596,970 | 5/1952 | Adams .................... 206/59 |
| 2,610,812 | 9/1952 | Epstein et al. .................... 242/146 |
| 2,630,280 | 3/1953 | Wedler .................... 242/128 |
| 2,709,553 | 5/1955 | Wellcome .................... 242/171 |
| 2,739,766 | 3/1956 | Rayburn .................... 242/128 |
| 2,950,876 | 8/1960 | McLoughlin .................... 242/128 |
| 3,053,410 | 9/1962 | Eaddy .................... 220/93 |
| 3,127,012 | 3/1964 | Smoot .................... 206/56 |
| 3,147,694 | 9/1964 | Northup .................... 100/219 |
| 3,152,694 | 10/1964 | Nashed et al. .................... 206/63.2 |
| 3,158,335 | 11/1964 | Deussen .................... 242/172 |
| 3,216,559 | 11/1965 | Forbes et al. .................... 206/2 |
| 3,259,383 | 7/1966 | Johnson et al. .................... 267/161 |
| 3,272,455 | 9/1966 | Sternberg et al. .................... 242/171 |
| 3,297,225 | 1/1967 | Bransten .................... 229/3.5 |
| 3,491,967 | 1/1970 | Sawyer et al. .................... 242/129 |
| 3,604,873 | 9/1971 | Boliver .................... 200/150 |
| 3,700,185 | 10/1972 | Hubbard et al. .................... 242/159 |
| 4,027,865 | 6/1977 | Greenwood et al. .................... 267/161 X |
| 4,180,008 | 12/1979 | Nakamoto .................... 116/170 |
| 4,300,734 | 11/1981 | Green et al. .................... 242/170 |
| 4,322,483 | 3/1982 | Tune .................... 429/50 |
| 4,371,293 | 2/1983 | Wilcox et al. .................... 411/531 X |
| 4,869,367 | 9/1989 | Kawasaki .................... 206/409 |

FOREIGN PATENT DOCUMENTS

| | | |
|---|---|---|
| 947504 | 8/1956 | Fed. Rep. of Germany . |
| 2610721 | 9/1977 | Fed. Rep. of Germany . |
| 133579 | 3/1991 | Japan . |
| 264169 | 3/1991 | Japan . |
| 734718 | 8/1955 | United Kingdom . |
| 1220788 | 1/1971 | United Kingdom . |

OTHER PUBLICATIONS

European Search Report dated Sep. 7, 1992.

*Primary Examiner*—Paul T. Sewell
*Assistant Examiner*—Jacob K. Ackun, Jr.
*Attorney, Agent, or Firm*—Body, Vickers & Daniels

[57] ABSTRACT

A retainer ring for a container of low twist welding wire which container includes a cylindrical outer wall, a lower partition and an upper opening through which the welding wire is drawn from a hollow, cylindrical spool of welding wire formed from a multitude of convolutions of wire in layers provided in the container wherein the retainer ring comprises a generally flat outer portion with an outer periphery fitting into the outer wall of the container, minimally contacting the wire surface, and comprising a number of projecting lobe portions whereby the outer periphery of the ring contains alternate areas first being closer to and then being farther from the outer walls of the container when the retainer ring is resting upon the hollow spool of welding wire in the container and an inner bell mouthed portion extending upwardly and defining an innermost wire extraction opening with a diameter substantially smaller than the spool of wire in the container.

27 Claims, 6 Drawing Sheets

RETAINER RING FOR WELDING WIRE CONTAINER DISCLOSURE

This is a continuation of application Ser. No. 716,910, filed on Jun. 18, 1991.

DISCLOSURE

This invention relates to the art of feeding small diameter welding wire from a bulk storage container and more particularly to a retainer ring for a welding wire container having a large spool of small diameter welding wire which is payed out from the container for mass production welding.

INCORPORATION BY REFERENCE

Incorporated by reference Kawasaki U.S. Pat. No. 4,869,367 contains a number of prior art retaining rings. This patent discusses background in the art to which the present invention is specifically directed. By incorporating this patent by reference, the problems to which the present invention is directed and the background of the field of art need not be repeated in detail.

BACKGROUND OF INVENTION

The present invention is particularly applicable for use in a container of welding wire having a natural "cast" which means that in the free state the wire tends to seek a generally straight line condition and the invention will be described with particular reference to a natural cast type of welding wire stored as a large spool containing convolutions formed into layers of the welding wire which is payed out from the inside diameter of the spool through the upper portion of the container storing the spool. However, the invention has broader applications and may be used with any type of low twist welding wire contained in a spool to be fed from the center of the spool through the top of the container with or without a tendency to retain a generally straight condition. When welding automatically or semi-automatically it is essential that large amounts of welding wire be continuously directed to the welding operation in a non-twisted, non-distorted non-canted condition so that the welding operation is performed uniformly over long periods of time without manual intervention and/or inspection. It is a tremendously difficult task to be assured that the wire is fed to the welding operation in a non-twisted or low twist condition so that the natural tendency of the wire to seek a preordained natural condition will not be detrimental to smooth and uniform welding. To accomplish this task, welding wire is produced to have a natural cast, or low twist condition, which means, if a portion of the wire were cut into a long length and laid onto a floor the natural shape would be a straight line of the welding wire. When such wire is wrapped into a spool and a large container containing several hundred pounds of wire for automatic or semi-automatic welding, the natural tendency of the wire to remain in a straight or non-twisted condition makes the wire somewhat live when it is wrapped into an unnatural series of convolutions distorting the wire from its natural state. Thus, manufacturers produce large containers of low twist welding wire which must be removed from the container without twisting, tangling and/or introducing unwanted canting into the wire itself. For that reason, there is a tremendous amount of effort being directed merely to the concept of paying out low twist welding wire to an automatic and/or semi-automatic welding operation. If the pay out mechanism is not consistent and flaw proof, massive welding operations, which can consume a large amount of welding wire and a substantial amount of time, will be defective and require expensive reprocessing. This is a problem which must be solved by manufacturers of welding wire as they sell the welding wire in large spools to be payed out for automatic and semi-automatic welding. This problem is compounded with the trend toward even larger packages with larger stock of welding wire to thereby reduce the time required for replacement of the supply container at the automatic or semiautomatic welding operation. Consequently, there is an increased demand for a pail like container which is easily adapted to a large capacity and is constructed in a manner that withdrawing of the welding wire from the container is accomplished smoothly without disturbing the natural flow of the welding wire or twisting the welding wire with adjacent convolutions. Actual twisting and tangling of the wire can cause interruption of wire flow and drastically interrupt the welding operation. Thus, a large volume, high capacity storage or supply container for welding wire spools must be so constructed that it assures against any catastrophic failure in the feeding of a wire to the welding operation and the container. Further the payout or withdrawing arrangement of the container must be assured that it does not introduce even minor distortions in the free straight flow of the welding wire to the welding operation. Consequently, there is a substantial demand for a container and withdraw arrangement for large spools of welding wire which not only prevent tangling and disruption of the supply of welding wire to the welding operation but also prevent even minor distortions in the wire which could affect the quality of the continuous welding operation.

The welding wire stored in the supply container is in the form of a spool having multiple layers of wire convolutions laid from bottom to top, with an inner diameter of the spool being substantially smaller than the diameter of the container. Due to the inherent rigidity of the welding wire itself, the convolutions forming the layers are continuously under the influence of a force which tends to widen the diameter of the convolutions. However, as the welding wire is withdrawn from the container, the loosened wire portion tends to spring back and disturb or become entangled with other looped layers or with itself causing variations in the resistance of the wire withdrawal force. In such cases it becomes difficult to withdrawn the wire or feed the wire smoothly. In some of the prior containers, the wire spool or wire package is provided with a preselected twist when spooling the wire into the package in order to prevent torsional deformation of the wire which is being withdrawn axially from the non-rotating container. Consequently, the packaged wire of the spool tends to spring up with a greater force. Consequently, retainer rings, or members are placed on the top of the wire spool to hold the wires in the upper layers in place as they are withdrawn, convolution at a time, from the center opening of the wire spool through the top opening of the supply container. In the past, substantial effort has been devoted to the prevention of a "lost" convolution in the spool itself. This feeding error is normally prevented by a center tube of cardboard placed in the spool cavity so that all convolutions must be withdrawn from around the center tube. In the prior art, the ring itself contacts the inner surface of the container to prevent convolutions from springing above and around the outside of the retainer ring. In the past, the retainer ring generally rests upon the top of the wire spool by gravity. The ring has extended resilient members or fingers for contacting the inner surface of the container drum to protect the outside convolutions of the welding wire. Some of the prior rings have had a series of flat spring steel fingers attached to the retainer ring. These fingers tightly ride against the drum to control the outside convolutions of wire. In some instances, a cardboard ring is cut to the desired shape with a slight interference with the drum wall. This ring is held on the top of the spool by a weight which travels down the drum as the wire level is reduced. All of these arrangements present difficulties. Wire can be tangled on the outside of the ring and substantial drag can be imparted to the wire as it is being payed out or withdrawn from the container. These devices have friction contact with the container wall and substantial friction induced drag is exerted against the wire as it is being withdrawn. This is especially apparent as the withdrawing process continues toward the lower layers of wire in the container.

THE INVENTION

In accordance with the present invention, there is provided a retainer ring or retainer member for a container of low twist welding wire which container includes a cylindrical outer wall having a set diameter, a lower partition for supporting the wire and an upper opening wherein the container is adapted to hold and allow controlled payout or withdrawal of a multitude of convolutions of welding wire formed into layers defining a hollow, cylindrical spool or package of the welding wire. The spool of welding wire wound in the supply container has an outer cylindrical surface generally engaging the cylindrical inner wall of the container and an inner cylindrical surface defining a central cavity in the spool of welding wire. The central cavity has a selected diameter. The retainer ring of the present invention comprises a generally flat outer portion with an outer periphery fitting into the set diameter of the inner wall of the container and comprising a number of projecting lobe portions whereby the outer periphery of the retainer ring contains alternate areas that are closer to and then farther away from the outer wall of the container when the retainer ring is resting on the upper surface or top of the hollow, cylindrical spool or package of welding wire. In accordance with another aspect of the invention, the retainer ring has an inner bell mouthed portion defining an innermost wire extraction opening. In this manner, the convolutions of wire are pulled up through the bell mouthed portion which extends upwardly toward the outlet guide in the top cover or "hat" of the container. The convolutions of wire, as they are pulled from the spool, move inwardly toward and into the center cavity of the spool and then upwardly through the bell mouth portion toward the exit guide in the container hat.

In accordance with still a further aspect of the invention, the wire extraction opening defined by the upper end of the bell mouthed portion of the retainer ring has a diameter substantially smaller than the selected diameter of the spool itself so that the wire must move inwardly before it can move upwardly. By using the bell mouthed concept, the inward movement of the convolutions from the spool does not have friction drag against other convolutions and does not have substantially friction drag along the bottom of the retainer ring as the convolutions from the upper layer are moving inwardly and then upwardly to the outlet guide in the cover or hat of the supply container.

By using the present invention, the container ring is formed from sheet steel and allows a small gap or clearance between the outer periphery of the retainer ring or member and the inner drum surface. The outside periphery of the inventive ring has a surface defining a number of lobes which are generally two arcs intersecting each other and rounded off at the point of interception with a blending radius. In the preferred embodiment there are three lobes; therefore, the outer periphery of the ring is generally triangular in shape with the lobe portions rounded with a relatively small radius curved outermost projection. Consequently, the wire in the spool is allowed to move upwardly past the outer periphery of the retainer ring at the drum surface. Since the lobe defines a series of alternate areas first closer to and then farther away from the inner surface of the drum, the convolutions of wire that move upwardly between the container and retainer ring readily slip downwardly back under the next lobe of the retainer ring when the convolution is pulled outwardly in the feeding process. Thre is no tangling of the wire. In this manner, the retainer ring, which is preferably formed of metal having a sufficient weight to hold the ring down against the upper portion of the spool, can remain firmly against the upper surface of the spool while moving slightly in a transverse direction within the container itself. To accomplish the concept of alternate areas of the retainer ring close to and far away from the container wall, three or more lobes could be formed. Preferably three to six lobes are believed sufficient to allow the intended function of the outer periphery of the ring.

There are other causes of tangling of the wire as it is being withdrawn from the spool within the supply container. For instance, wire tangles can be caused by an extra turn of wire being pulled to the inside of the retainer ring and then getting loose at the center portion of the spool. A tangle can be caused by temporarily increasing the drag on the wire being withdrawn allowing the wire to lift the retainer ring so that a convolution of welding wire is released. Further, a wire tangle can be caused when only a small amount of wire is left on the spool in the drum or container and there is a long unsupported column of wire from the spool toward the upper cover of the container. In that instance, the wire can get ahead of itself and allow an extra turn to be released and thus tangled. All of these other causes of tangling of the wire are overcome by the present invention. These tangling phenomenon have been addressed in the past by adding a tubular cardboard core to the inside of the spool to prevent the convolutions from becoming free or loose and thus flipping from one side of the container to the other or by using a core of this type together with a mechanized dereeling "hat" that has a rotating guide inside the container that follows the welding wire in a rotating fashion around the container. This rotating mechanism effectively shortens the unsupported column of wire and reduces the drag of the wire during the withdrawing process. Both of these structures are costly and cause assembly problems. They also present substantial friction on the wire and reduce the actual smoothness of the welding process even though they may prevent catastrophic tangles which could interrupt the welding process altogether. The present invention corrects these other tangling phenomenon by forming the retainer ring with a bell-shaped or bell mouthed innermost portion that projects upwardly from a transverse position generally inside of the inner diameter of the cavity in the wire spool. The bell mouthed portion defines an extraction opening for the wire that has a diameter which is smaller than the inner diameter of the wire spool cavity. Thus, there is no need for an inner core in the drum. The shape of the bell mouth on the retainer ring causes only a small amount of contact between the undersurface of the retainer ring and the wire as the wire is being drawn from the top layer of the wire spool. The only hard contact with wire is near the outside of the spool. Pressure is relieved from the convolutions of the wire as they are drawn inwardly and upwardly toward the opening in the retainer ring. The novel shape of the inner portion of the retainer ring constructed in accordance with the present invention allows the outer turns of the wire to ride over the inner turns or convolutions of the wire rather than pulling the inner convolutions free from the spool allowing the inner convolution not being pulled from the spool to flip and cause a tangle. The height and smaller diameter of the bell mouth also makes it extremely difficult for a free convolution of wire to find its way above the ring itself to tangle from the outside by snapping over the top of the ring. To snap free under the ring, a convolution under the ring would have to first be distorted into the small diameter of the opening, which distortion is against its natural tendency, and then rise up through the flared bell before it could snap free and cause a tangle. Thus, the bell mouth has substantial advantages over the prior art and allows for smooth uniform withdrawal of the wire from the spool in the storage or supply container. The height of the bell mouth effectively shortens the unsupported column of wire between the top of the bell mouth and the guide in the cover of the container. By reducing the friction causing contact and the force of this contact between the undersurface of the retainer ring and the wire as the wire is being withdrawn, the invention creates less drag on the wire. The smaller diameter of the wire extraction opening in the bell discourages a long length of wire from getting ahead of itself when the spool is substantially exhausted.

The primary object of the present invention is the provision of a retainer ring for an automatic, or semi-automatic welding wire container which retainer ring or member allows removal of the welding wire from the supply spool smoothly, without tangling and without affecting the normal "cast" of the wire.

Yet another object of the present invention is the provision of a retainer ring or member, as defined above, which retainer ring or member prevents both catastrophic tangling of the wire being withdrawn from the supply container and also prevents any minor distortions being imparted to the wire as it is being withdrawn from the storage container.

Still a further object of the present invention is the provision of a retainer ring, as defined above, which retainer ring prevents wire tangling, presents low friction drag on the wire being withdrawn and allows the use of a low cover to decrease the amount of unsupported wire between the retainer ring and the guide in the cover, even when the spool of wire in the container is nearly exhausted.

Yet a further object of the present invention is the provision of a retainer ring, as defined above, which retainer ring has an outer periphery which is spaced from the container wall and is constructed to prevent entanglement caused by any outer convolutions passing upwardly around the outer periphery of the retainer ring.

These and other objects and advantages will become apparent from the following description taken together with the accompanying drawings.

PREFERRED EMBODIMENT

Figure 1:
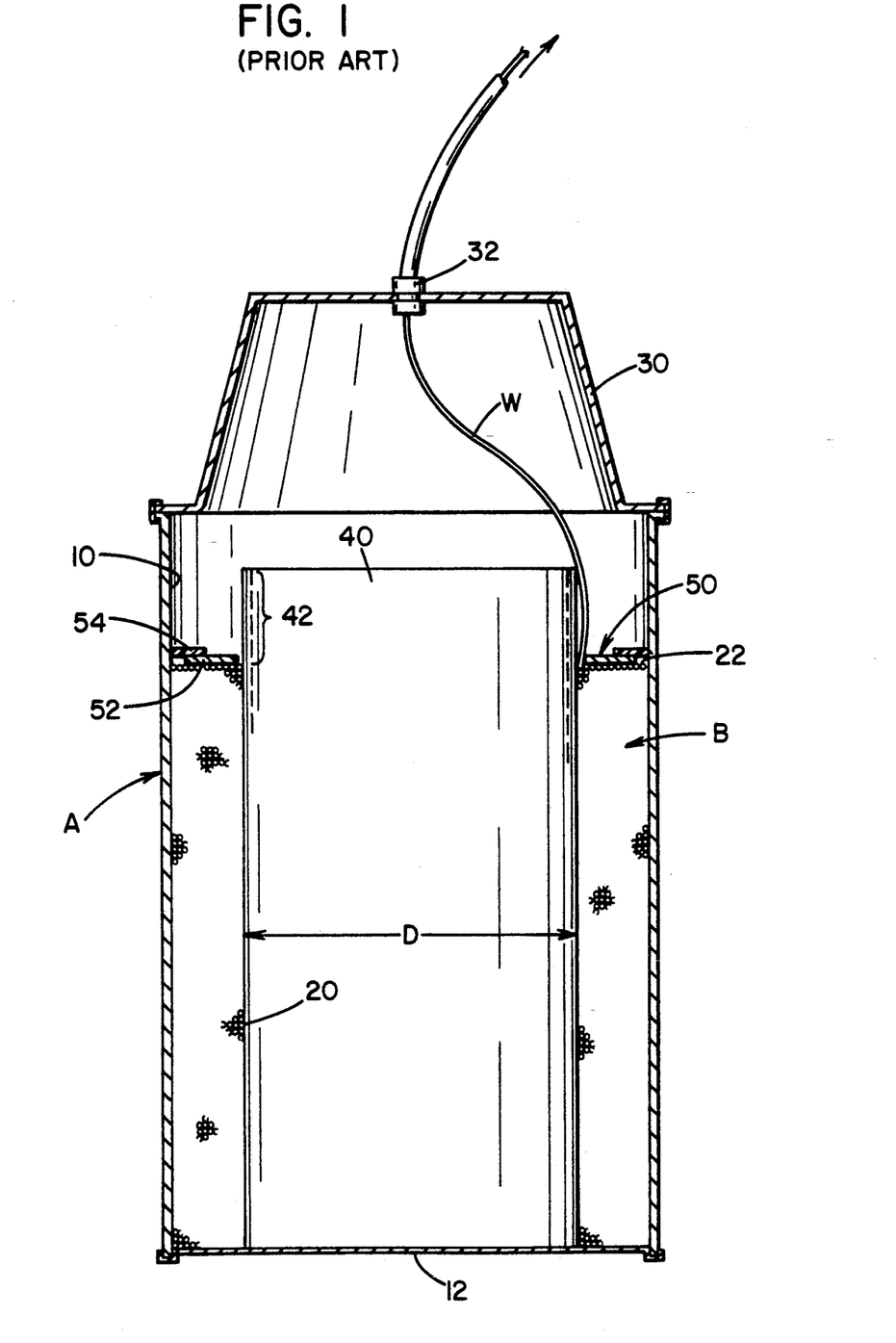
FIG. 1 is a cross sectional schematic view of a prior art container and retainer ring combination.
Figure 1A:
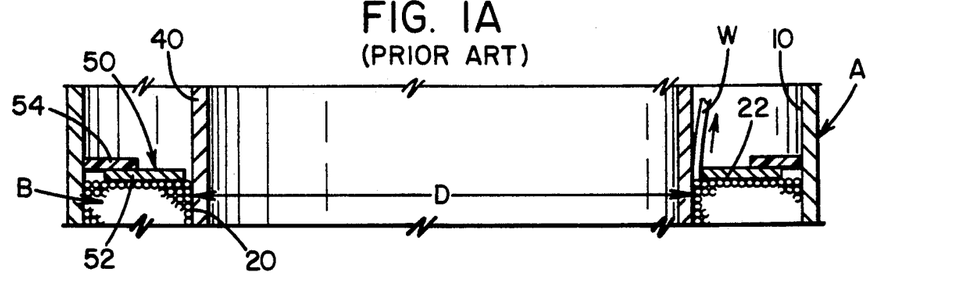
FIG. 1A is an enlarged schematic view of the retainer ring used in FIG. 1.

Referring now to the drawings, FIGS. 1 and 1A, show a prior container used in dispensing low twist wire for automatic and/or semi-automatic welding. The container includes a standard drum A, hereafter referred to as the container, which drum may be formed of cardboard and has an inner wall 10 and a lower support partition 12. Within this container or drum is stored a large volume of welding wire in the form of spool or package B having an internal cavity 20 with an internal diameter D, best shown in FIG. 6. The upper generally flat top surface or layer 22 of wire spool B is the upper layer of several convolutions of a natural cast or low twist wire. As the wire is withdrawn from spool B, it comes first from the upper layer forming generally flat top 22 then from the next layer and advances in this fashion from the top to the lower portion of the spool. Above spool B is an upper cover or "hat" 30 through which wire W is withdrawn at a wire guide 32. In the past a cardboard tube 40 was often mounted inside spool B to have an upper extension 42 so that the relatively "live" convolutions of wire at the upper surface 22 could not snap across the central cylindrical cavity 20 of spool B. It was common to employ a gravity retainer ring, such as ring 50 formed from a flat sheet steel ring 52 and an outer foam ring 54. The outer ring allows frictional engagement with the inner wall 10 of container or drum A. The sizing ring 54 assured that no convolution of wire from the upper surface 22 will snap over the top of the retainer ring to be trapped in the space between wall 10 and the inner surface of cardboard tube 40. In other modifications of flat ring 50, resilient fingers extend from the steel ring 52 into frictional engagement with wall 10 of container A. As wire W is pulled from spool B and between the inner surface of ring 52 and the outer surface of tube 40, wire W extends over a relatively long distance to guide 32, as shown in FIG. 1. As shown in FIG. 1A, as the convolutions of wire forming surface 22 are pulled from the space between the retainer ring and tube 40, there is substantial friction with the tube and with the under surface of ring 52. Cover 30 must have a substantial extended height because of the extension 42 on tube 40. Thus, there is a substantial unsupported length of wire W, especially as spool B is exhausted. The problems associated with this prior art have been described.

Figure 2:
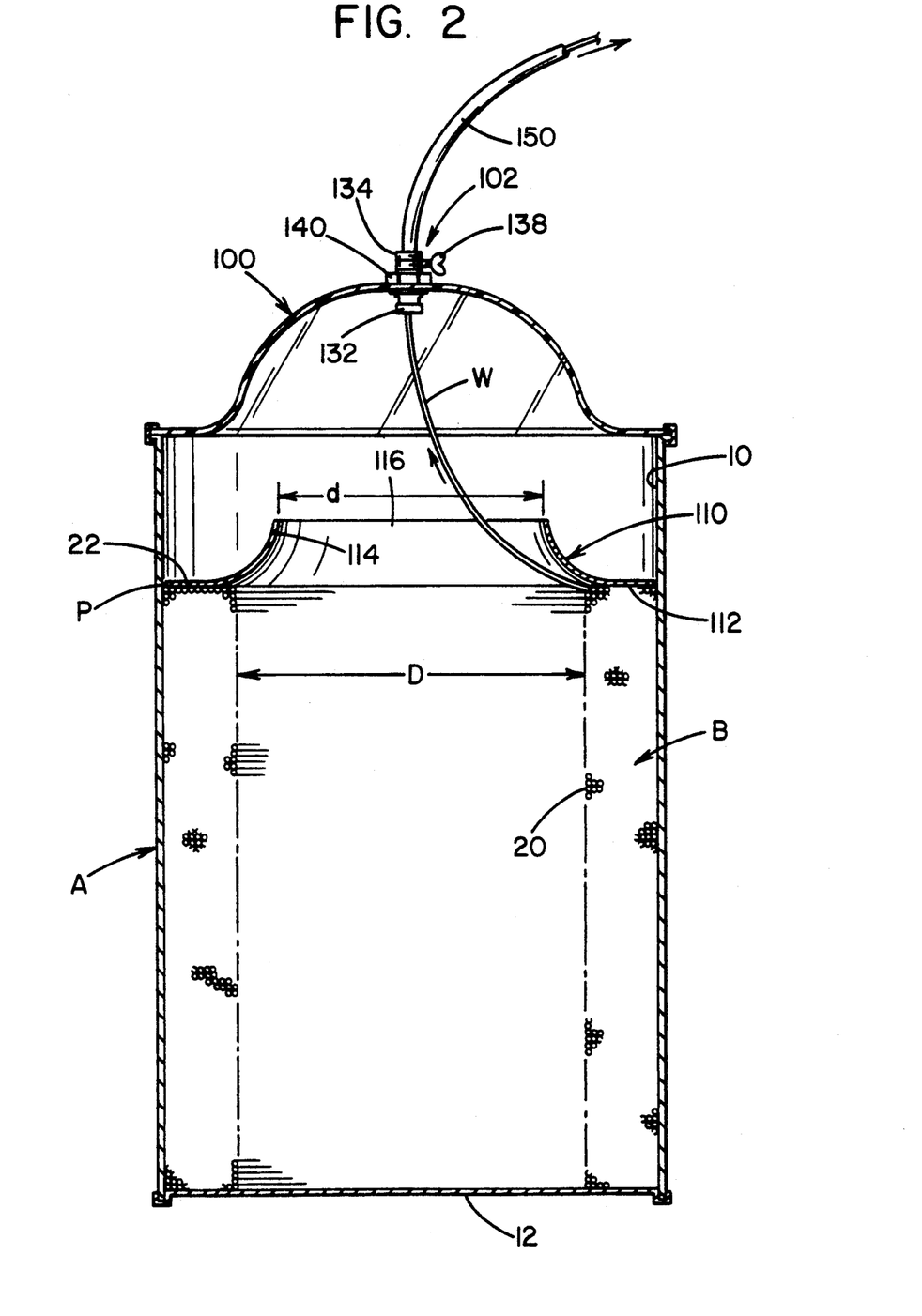
FIG. 2 is a cross sectional schematic view of the preferred embodiment of the present invention.
Figure 2A:
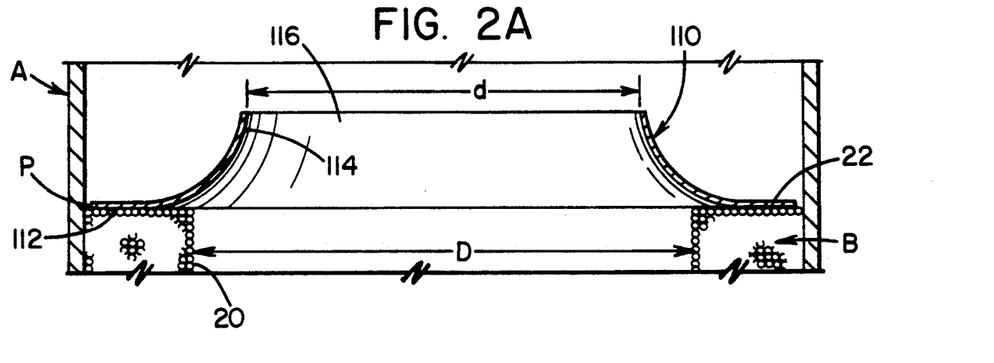
FIG. 2A is an enlarged cross sectional view showing the preferred embodiment of the retainer member of the present invention.
Figure 3:
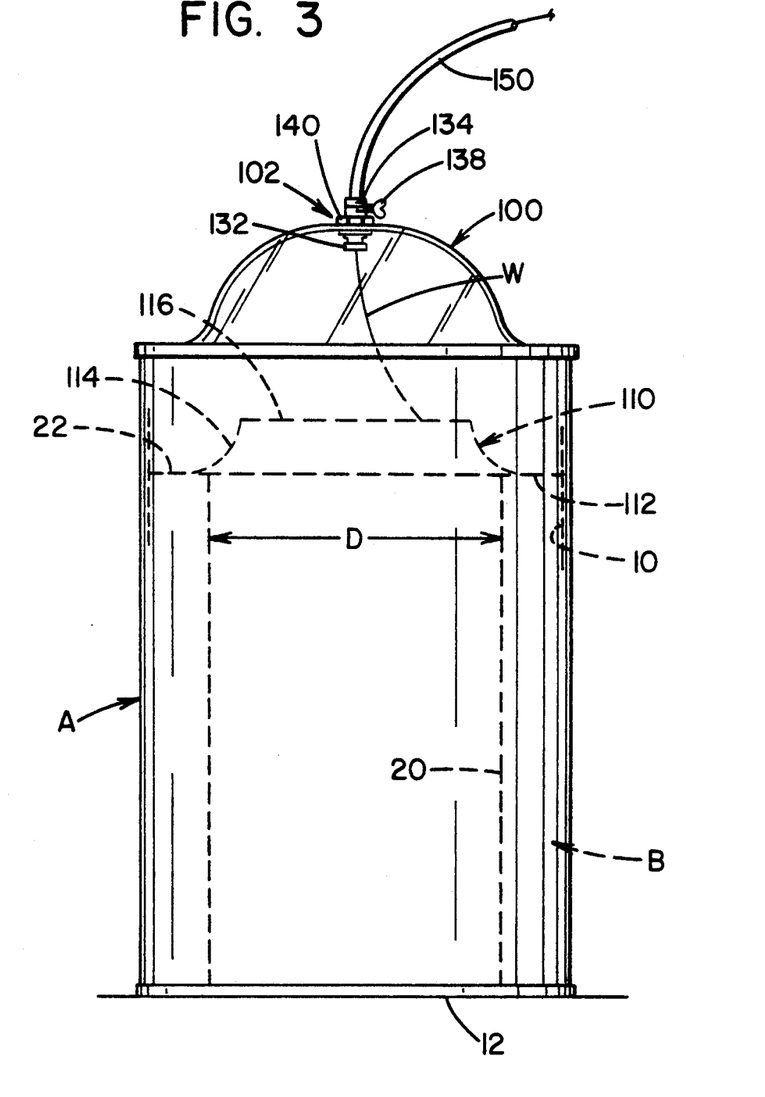
FIG. 3 is a side view of a container showing the retainer ring of the present invention in dotted lines and illustrating operating characteristics of the present invention.

Referring now to the preferred embodiment of the present invention, standard container or drum A, formed preferably of cardboard, is provided with the spool B of low twist welding wire having a neutral cast, as shown in FIGS. 2, 2A and 3. A cover 100 can be substantially lower in profile than cover 30 of the prior art because there is no tube extension or other structure which must be cleared by the cover to provide free movement of wire W as it is being withdrawn through upper wire guide 102, best shown in FIG. 4. The retainer member 110 of the present invention includes an outer generally flat ring portion 112 adapted to rest by gravity onto the upper layer or surface 22 of spool B. Flat portion 112 has an innermost area which is greater in diameter than the inner diameter D of spool B so that the inner portion of upper surface is not directly engaged by the flat portion 112. Flat portion 112 also has an outer periphery P which, in accordance with an aspect of the invention, has a specific structure that will be described in more detail with respect to the showings in FIGS. 5 and 6. The innermost portion of retainer member or ring 110 is a bell mouth portion 114 terminating in an upper extraction opening 116 having a diameter d substantially less than the diameter D of the inner cavity 20. Thus, wire W must move inwardly into cavity 20 before it can be moved upwardly through extraction opening 116. This inward movement applies minor resilient deflection of the wire and does not create a substantial drag, since the bell mouthed portion 114 of ring 110 gradually diverges upward in accordance with a selected radius. This curve relieves pressure on the wire and thus decreases the frictional force caused by dragging the wire W from under ring 110 toward the upper extraction opening 116. If a wire convolution moves upwardly around periphery P it can not progress inwardly across the total expanse of drum or container B because of the upwardly extending bell mouth portion 114 of retainer ring 110. In addition, the next adjacent lobe will hold down the convolution. In a like manner, in order to lose control over a convolution of wire in spool B from under retainer 110, the convolution must be forced into a diameter less than diameter d of extraction opening 116. This is against the natural tendency of the convolutions and can not occur under normal operating conditions.

Figure 4:
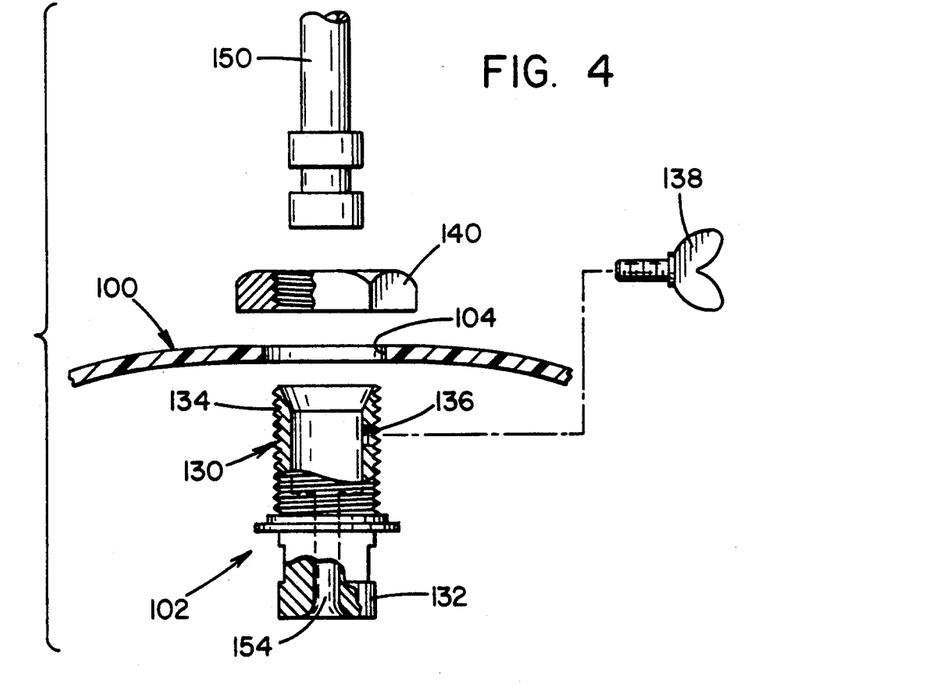
FIG. 4 is an enlarged, partially cross sectioned exploded view showing the upper wire guide in the cover of the container shown in FIG. 3.

Guide 102 is illustrated in FIG. 4 as including a nipple 130 having a guide tube 132 with an innermost threaded end 134. An orthogonal threaded opening 136 receives a wing nut 138. An opening 104 in cover 100 receives nipple 130 which is tightened in place by a nut 140. Thereafter, the feeder tube 150 for the welding station is placed into threaded end 134 of nipple 130 and is releasably attached by the nipple threads and/or the wing nut 138. A small guide opening 154 in nipple 130 has a wear guide that coacts with a corresponding opening in tube 150 to guide wire W through nipple 130 and tube 150 into the welding operation in accordance with standard practice.

Figure 5:
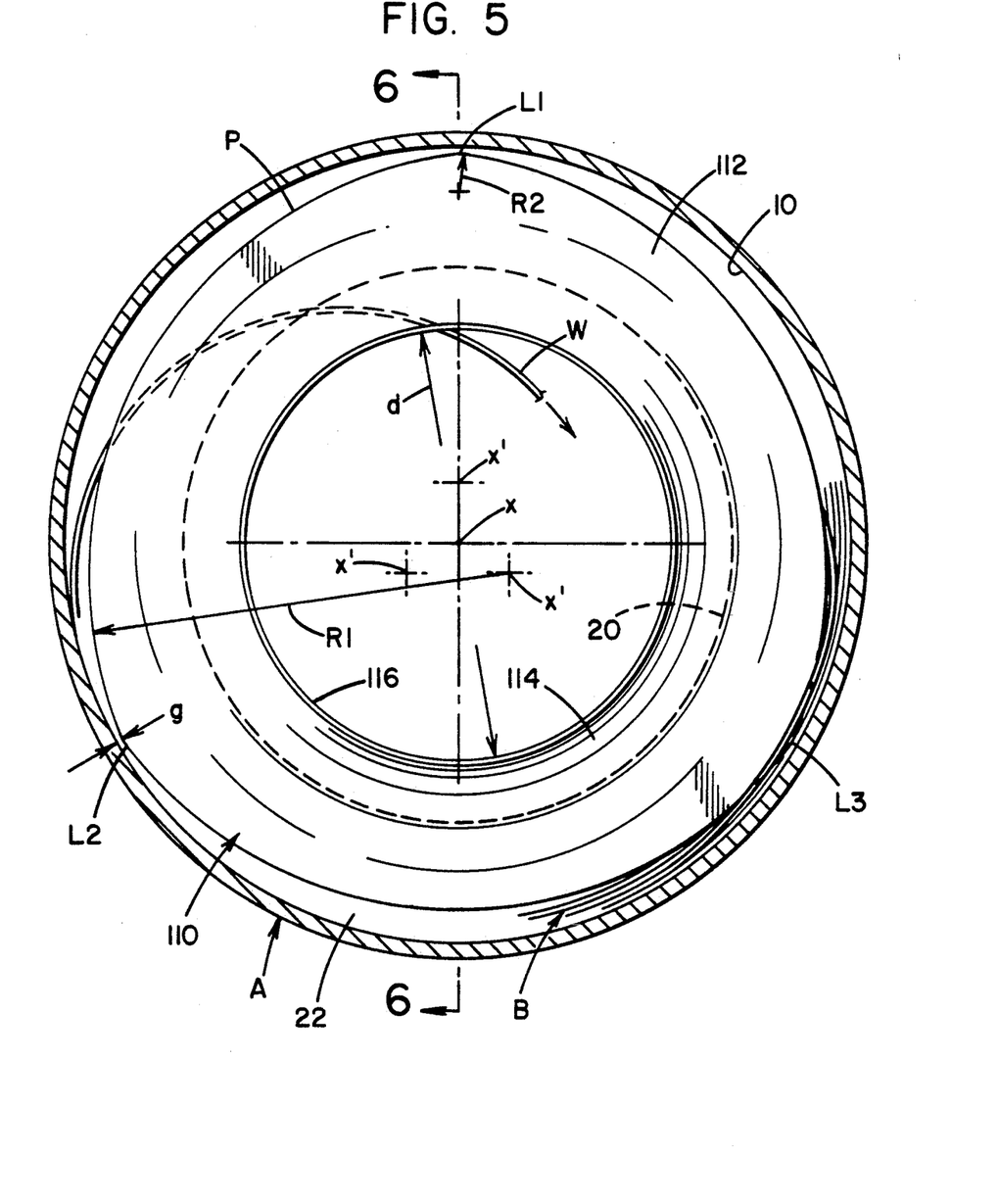
FIG. 5 is a top plan view of a retainer ring constructed in accordance with the preferred embodiment of the present invention; and, FIG. 6 is a side view taken generally along line 6-6 of FIG. 5.
Figure 6:
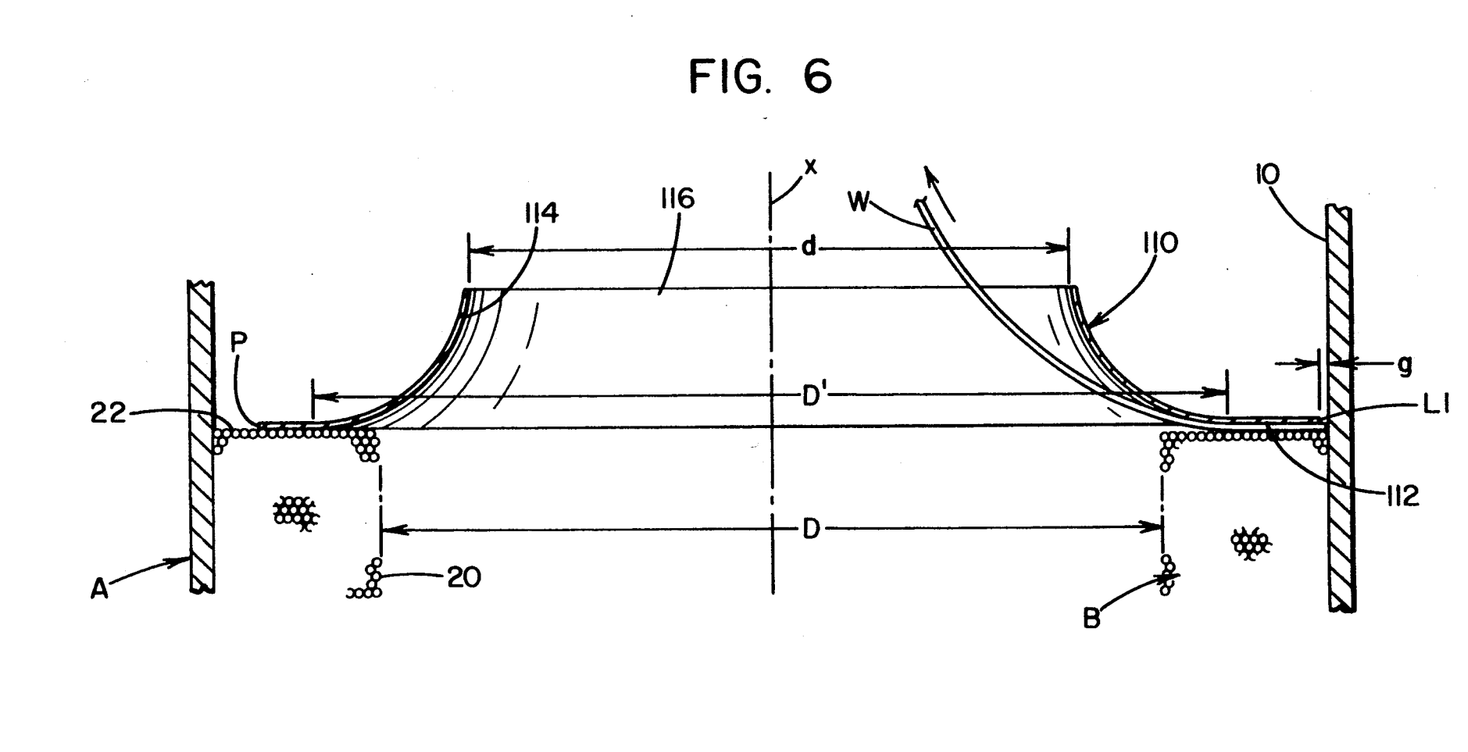

Details of the retainer ring 110 are illustrated in FIGS. 5 and 6 wherein the dimensions and angles of the preferred embodiment are set forth. The diameter d of opening 116 is substantially less than the diameter D of spool B. In addition, the inner diameter of flat portion 112 is illustrated as diameter D'. This diameter D' is substantially greater than the diameter D. Thus, pressure is applied to the upper surface 22 of spool B in the area below generally flat ring portion 112 of retainer ring 110 outside diameter D'. The retainer member is spaced a distance g from inner wall 10 of container A as shown in FIGS. 5 and 6. Thus, the retainer member can move slightly in a transverse direction as it maintains pressure downwardly upon the spool. Thus, the friction drag of the retainer against the drum does not subtract from its primary function of maintaining the pressure on the outermost portion of spool B during the withdrawing process. As shown in FIG. 5, in the preferred embodiment the outer periphery P is in the form of three lobes, L1, L2 and L3. Three or more, and preferably 3-6 lobes are to be used. These lobes are formed by a radius R1 with a center x' spaced away from center x of extraction opening 116. Thus, the outer periphery P is essentially a triangle with the intersecting arcs having a radius R1. The arc could be at center axis x and form the desired lobes; however, the offset concept has proven smoother in operation. At the intersection of the arcs forming the lobes L1, L2 and L3, there is a blending radius R2 which defines the gap g when retainer 110 is centered within drum or container A. The lobes are symmetrically located around periphery P and provide areas at the lobes which are close to the wall 10. Between the lobes there are areas which are farther away from wall 10. Thus, a wire, as shown in FIG. 5, shifts upwardly between periphery P and wall 10, it is easily pulled back under the ring while avoiding being snagged because of the curvature forming the end of the lobe and then up through the bell portion 114 and through opening 116 when that particular convolution is called upon to be withdrawn from the non-rotating drum.

Having thus defined the invention, the following is claimed:

1. A retainer ring adapted for use with a container of low twist welding wire, said retainer ring comprising: a generally flat outer portion with an outer periphery, an inner diameter and a radial distance therebetween, said retainer ring containing a number of projecting lobe portions, each said lobe portion generally disposed in said flat outer portion whereby said radial distance from said inner diameter to said outer periphery varies within each said lobe portion and an inner bell mouthed portion defining an innermost wire extraction opening having a center, said bell mouthed portion gradually curving upward from said inner diameter of said flat portion to said wire extraction opening in accordance with a selected radius, said bell mouthed portion including an interior side and an exterior side, said interior side including a continuous convex surface between said inner diameter and said wire extraction opening, said wire extraction opening having a diameter smaller than said inner diameter of said flat portion.

2. A retainer ring adapted for use with a container of low twist welding wire, said retainer ring comprising: a generally flat outer portion with an outer periphery and an inner periphery, an innermost wire extraction opening having a center and a bell mouthed portion, said bell mouthed portion having an interior and an exterior side, said inter side including a continuous convex surface between said inner periphery and said extraction opening, said retainer ring containing a number of projecting lobe portions disposed in said flat outer portion, each said lobe portion defined by the intersection of two arcs, each arc having a given radius and having a center of each said radius offset from said center of said extraction opening, whereby said outer periphery contains alternate areas closer to and farther from said inner periphery.

3. A retainer ring as defined in claim 2 wherein said innermost opening has a diameter smaller than said inner periphery and substantially smaller than said outer periphery.

4. A retainer ring as defined in claim 3 which ring is formed integrally from a sheet material.

5. A retainer ring as defined in claim 4 wherein said sheet material is metal.

6. A retainer ring as defined in claim 2 said inner bell mouthed portion defining said innermost wire extraction opening.

7. A retainer ring as defined in claim 2 which ring is formed integrally from a sheet material.

8. A retainer ring as defined in claim 7 wherein said sheet material is metal.

9. A retainer ring as defined in claim 1 which ring is formed integrally from a sheet material.

10. A retainer ring as defined in claim 9 wherein said sheet material is metal.

11. A container of low twist welding wire, said container comprising a cylindrical outer wall having a set diameter, a lower partition and an upper opening and adapted to contain and allow controlled pay ut of a multitude of convolutions of welding wire formed into layers defining a hollow, cylindrical spool, said wire having an inner cylindrical surface defining a central cavity in said spool and having a selected diameter, said container further including a retainer ring for resting on said spool, said retainer ring comprising a generally flat outer portion with an inner diameter and an outer periphery for fitting into said set diameter of said outer wall, an innermost wire extraction opening and an inner curved portion between said inner diameter and said innermost wire extraction opening, said inner curved portion gradually curving upward from said inner diameter of said flat portion to said wire extraction opening.

12. A container as defined in claim 11 wherein said innermost opening of said retainer ring had a diameter substantially smaller than said selected diameter of said spool when said retainer ring is resting on said spool.

13. A container as defined in claim 11 wherein said ring is formed integrally from a sheet material.

14. A container as defined in claim 13 wherein said sheet material is metal.

15. A retainer ring for a container of low twist welding wire comprising: a generally flat outer portion with an inner diameter and an outer periphery, an innermost extraction opening having a center, lobe portions defined by said outer periphery, said outer periphery formed by intersecting arcs each having a given radius with a center offset from said center of said extraction opening, said lobe portions generally disposed in said flat outer portion and an inner bell mouthed portion between said innermost wire extraction opening and said inner diameter, said bell mouthed portion curving upwardly from said flat outer portion to said wire extraction opening in accordance with a selected radius, said bell mouthed portion having an interior and an exterior side, said interior side including a continuous convex surface between said inner diameter and said extraction opening, said extraction opening having a diameter substantially smaller than said inner diameter of said flat portion.

16. A retainer ring for a container of low twist welding wire, said retainer ring comprising: an outer portion with an outer periphery and an inner periphery, said outer portion containing a number of projecting lobe portions whereby said outer periphery contains alternate areas closer to and farther from said inner periphery and an inner bell mouthed portion defining an innermost wire extraction opening having a center, said inner bell mouthed portion having an interior and an exterior side, said interior side including a continuous convex surface between said inner periphery and said extraction opening.

17. A retainer ring as defined in claim 16 wherein said number of projecting lobe portions is greater than 2.

18. A retainer ring as defined in claim 16 wherein said number of projecting lobe portions is 3.

19. A retainer ring as defined in claim 16 wherein said number of projecting lobe portions is in the range of 3-6.

20. A retainer ring as defined in claim 19 wherein said lobes are each defined by the intersection of two arcs each having a given radius with a center offset from said center of said extraction opening.

21. A retainer ring as defined in claim 1 wherein said lobes are each defined by the intersection of two arcs each having a given radius with a center offset from said center of said extraction opening.

22. A retainer ring as defined in claim 1 wherein said lobes are each defined by the intersection of two arcs each having a given radius with no center offset from said center of said extraction opening.

23. A container as defined in claim 11 wherein said innermost wire extraction opening has a center and said flat outer portion of said retainer ring includes projecting lobes each defined by the intersection of two arcs, each having a given radius with a center offset from the center of said extraction opening.

24. A container of low twist welding wire, said container including a cylindrical outer wall having a set diameter, a lower partition and an upper opening and containing and allow controlled pay out of a multitude of convolutions of welding wire, said welding wire formed into layers defining a hollow, cylindrical spool of said welding wire within said container where said spool has an outer cylindrical surface engaging said cylindrical outer wall of said container and an inner cylindrical surface defining a central cavity in said spool and having a selected diameter, a vertically movable retainer member loosely disposed within said container on top of said spool of welding wire, said retainer member comprising a generally flat outer portion with a outer periphery fitting into said set diameter of said outer wall and containing a number of projecting lobe portions whereby said outer periphery contains alternate areas closer to and farther from said outer wall when said retainer member is resting on said hollow, cylindrical spool of welding wire in said container and an inner bell mouthed portion defining an innermost wire extraction opening with a diameter substantially smaller than said selected diameter of said spool.

25. A retainer ring as defined in claim 24 wherein said number is greater than 2.

26. A retainer ring as defined in claim 24 wherein said number is in the range of 3-6.

27. A retainer ring as defined in claim 24 wherein said projecting lobe portions are each defined by the intersection of two arcs having a given radius with a center offset from the center of said extraction opening.

* * * * *